Patented Feb. 3, 1953

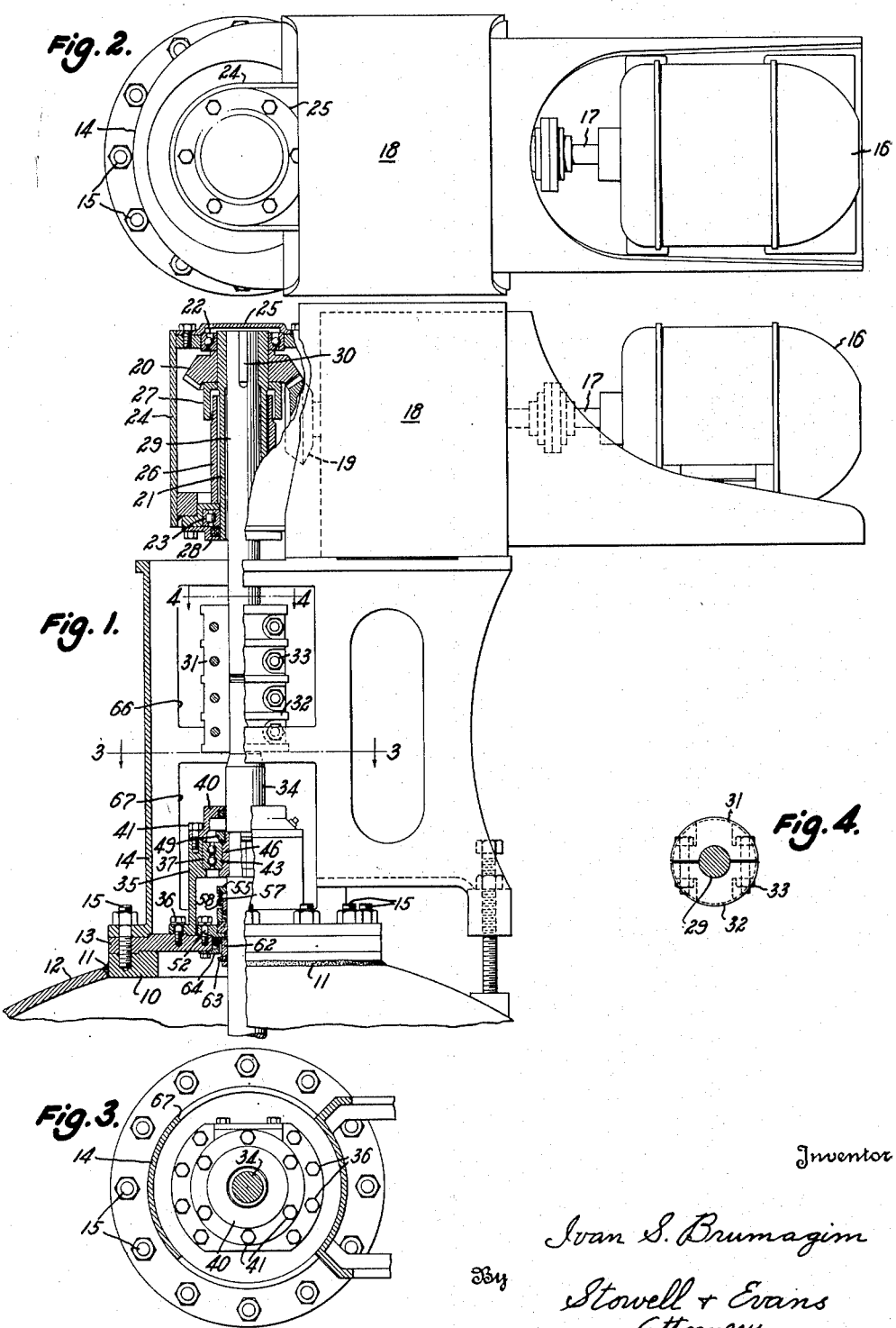

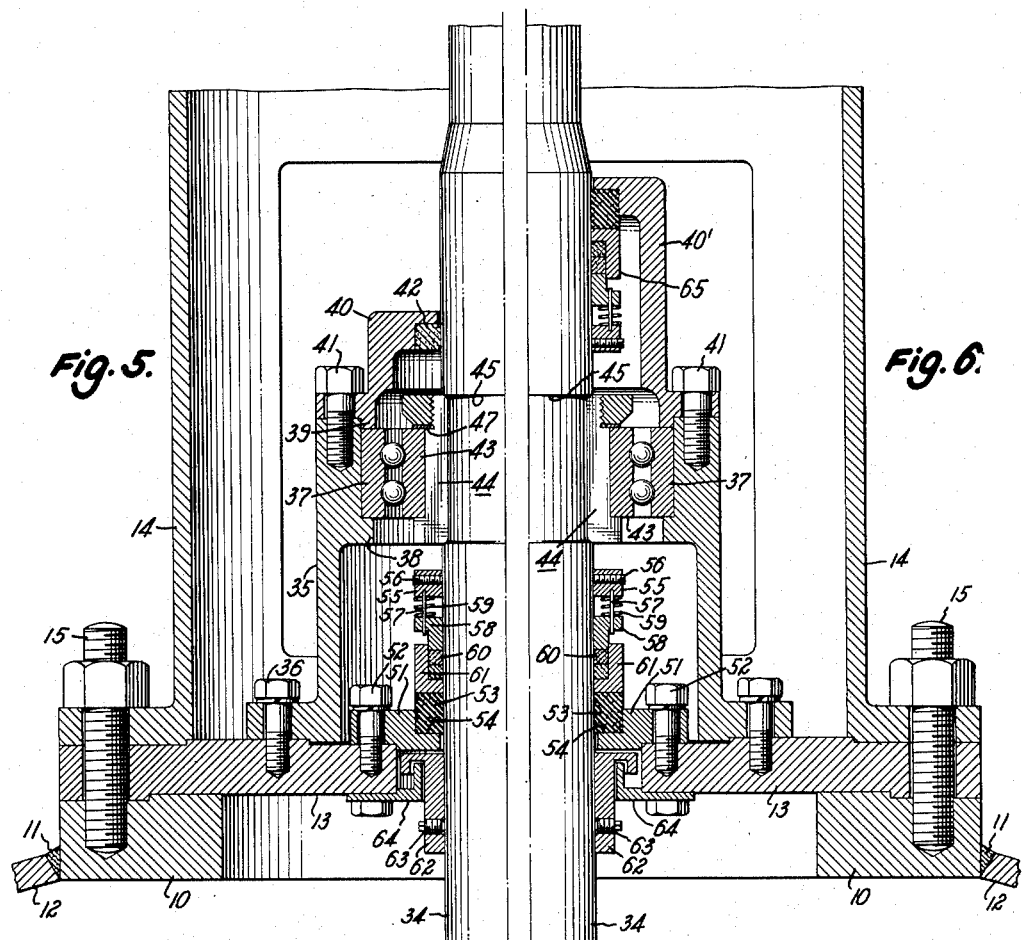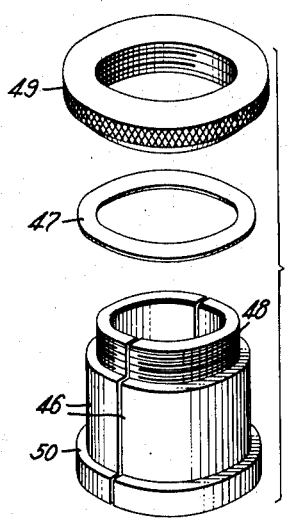

2,627,171

UNITED STATES PATENT OFFICE 2,627,171

AGITATOR DRIVE ASSEMBLY

Ivan Stanley Brumagim, Warren, Pa.

Application March 17, 1948, Serial No. 15,315

3 Claims. (Cl. 64—1)

This invention relates to agitator drive assemblies and more particularly to an agitator drive assembly for pressure vessels such as autoclaves and the like.

In agitator drive assemblies of this type, the agitator shaft passes through an opening in the pressure vessel and is driven from outside the vessel. Since the vessel is usually under super-atmospheric pressure, suitable sealing means must be provided to prevent pressure losses through the shaft opening. Also, thrust bearing means are provided to keep the agitator shaft in proper alignment and to prevent endwise movement of the shaft.

Preferably, the agitator of the invention is driven by a unit electric motor and gear reducer assembly positioned exteriorly of the pressure vessel with its power take-off in alignment with the agitator shaft, but it will be understood that other suitable driving arrangements may be used instead.

An object of the invention is to provide an agitator drive assembly of the type described wherein means is provided for making the shaft seals and bearings readily accessible for repair or replacement. Servicing operations may be performed on the seals and bearings without removing the driving motor and gears, as is usually necessary in the ordinary agitator drive.

Another object is to provide an agitator drive assembly in which bearing and sealing elements having continuous circular sections may be assembled and removed without disturbing the positions of the principal driving members or the main agitator shaft.

These and other objects, as will appear more fully in or be readily inferable from the following detailed description, are attained in an agitator drive assembly for attachment to a pressure vessel comprising a shaft having axially aligned separable portions including an agitator mounting portion and a driven portion, bearing means supporting the agitator mounting shaft portion in an orifice in the pressure vessel, sealing means around the agitator mounting shaft portion, means supporting the driven shaft portion for movement towards and away from the agitator shaft portion, and coupling means connecting the abutting ends of the separable shaft portions, whereby on uncoupling said coupling means the driven shaft portion may be moved away from the agitator mounting shaft portion for removal of said bearing and sealing means therefrom.

In the drawings,

Fig. 1 is partially sectionalized, elevational view of one form of agitator drive assembly in accordance with the invention;

Fig. 2 is a plan view of the assembly shown in Fig. 1;

Fig. 3 is a section taken along the plane of the line 3—3 of Fig. 1;

Fig. 4 is a section taken along the plane of the line 4—4 of Fig. 1;

Fig. 5 is an enlarged vertical section of the shaft bearing and sealing portions of the assembly shown in Fig. 1;

Fig. 6 is a view similar to Fig. 5 of a modified form of shaft sealing means, and Fig. 7 is an exploded perspective view of a split shaft bearing retaining ring as used in the assemblies of Figs. 1–6.

Referring now to the drawings, particularly to Figs. 1–4 thereof, the agitator drive assembly shown has a base ring 10 that may be welded as at 11 in an opening in the wall of a pressure vessel 12. The base ring carries a support disc 13, and the disc 13 and the main frame structure 14 are secured to the ring by studs 15.

Elevated well above the support disc and carried by the framework 14 is a unit drive assembly including an electric motor 16 connected by shaft 17 to a speed reducing gearing 18 that drives the output bevel gear 19.

Driving gear 19 meshes with a driven bevel gear 20 carried by the quill shaft 21 that is mounted for rotation in bearings 22 and 23 in the quill shaft housing 24. Quill shaft housing 24 is supported by the main frame 14 and has a cap 25 bolted to the top. Overlapping cylindrical grease retaining members 26 and 27 are mounted interiorly of the quill shaft housing and are carried by the housing and the quill shaft respectively. A grease seal 28 having the usual packing may be provided at the bottom of the housing 24.

Received within the bore of the quill shaft and depending therebelow is a driven shaft portion or stub shaft 29 that is keyed to the quill shaft by means of a key 30. A snug sliding fit is provided between the stub shaft and the bore of the quill shaft in the upper portions of the shafts adjacent to the key 30, while the lower portion of the quill shaft is bored, as shown, to an inside diameter substantially greater than the outside diameter of the stub shaft. Such construction assures good driving connection between the shafts yet permits ready withdrawal of the stub shaft from the quill shaft in an upward direction when the cap 25 is removed.

A compression coupling, including mating halves 31 and 32 secured together by bolts 33, couples the lower end of stub shaft 29 to the upper end of the main agitator shaft portion 34, the shaft portions being in vertical axial alignment. It will be understood that the main shaft portion 34 carries an agitator at its lower end (not shown) within the pressure vessel 12.

Immediately below the coupling, shaft 34 is flared outwardly and downwardly to provide a lower portion having a somewhat greater diameter than the portion received in the coupling. The main shaft portion passes downwardly through a bearing and seal to be described with particular reference to Figs. 5 and 7.

As shown in Fig. 5, the support disc 13 carries a thrust bearing support and shaft seal housing 35 secured to the disc by machine screws 36. A double thrust ball bearing has an outer race 37 received in a cylindrical bore in the top of housing 35 and seated against a shoulder 38. The outer race of the bearing is clamped in the housing by the rim 39 of the housing cover 40 that is fastened to the top of the housing by screws 41. Where the shaft 34 passes through the seal housing cover 40, the usual grease packing 42 is provided.

The inner race 43 of the thrust bearing is mounted on the shaft 34 by means of a bearing retaining ring designated generally by the reference numeral 44 and shown in detail in Fig. 7. As seen in Fig. 5, the bearing retaining ring or bushing 44 is seated in an annular recess 45 formed in the main agitator shaft portion.

In Fig. 7, the bearing retaining ring shown has a pair of complementary semi-cylindrical bushing elements 46—46 that are fitted together in the shaft recess 45 to form an annular bushing. A washer 47 is fitted over the threaded portion 48 of the bushing and a nut 49 is then screwed over the washer to complete the assembly. As may be clearly seen in Fig. 5, the inner race 43 of the thrust bearing is retained between the washer 47 and the shoulder 50 of the bushing.

Within the housing 35, a shaft seal is provided. The sealing device has a ring 51 surrounding shaft 34 and attached to the support plate 13 by screws 52. The ring carries a sealing element 53, specifically a carbon ring, seated in a recess 54. The carbon sealing element 53 is held stationary and the shaft 34 rotates within it.

Shaft 34 carries a complementary sealing member including a collar 55 secured to the shaft by set screws 56. A plurality of pins 57 project from the collar downwardly and parallel to the shaft. Surrounding the shaft with a sliding fit and slidingly engaged on the pins 57 is a ring 58 that is urged downwardly by springs 59 included between the ring and the collar. Ring 58 bears against the packing 60 held within the cup-shaped complementary sealing element 61, and urges the latter downwardly into contact with the upper face of the carbon ring 53 to provide a sealing interface. The cup-shaped element 61 is preferably made of brass, and, of course, rotates with the shaft against the carbon ring.

Beneath the sealing device described immediately above is an umbrella seal having a slinger ring 62 secured to the shaft 34 by set screws 63 and an interlocked cup member 64 fastened to the support plate 13.

The shaft bearing and sealing device of Fig. 6 is identical with the device of Fig. 5 except that the housing cover 40' extends upwardly for a greater distance than the cover 40 and, instead of having the simple packing 42, the housing cover has an annular disc seal 65 that is similar in all respects to the shaft seal described in connection with Fig. 5, but is inverted. The provision of disc seals at each end of the housing, as in Fig. 6, adapts the housing to receive a sealing and lubricating liquid under pressure, preferably under pressure substantially equal to the pressure within the vessel 12.

Having now described the agitator drive assembly, the manner in which a seal is replaced will be readily understood. Referring to Fig. 1, in order to replace a worn seal, the quill-shaft housing cover 25 is removed. The compression coupling 31—32 is then removed, access thereto being had through the frame openings 66 and 67. Stub-shaft 29 is then withdrawn upwardly through the quill-shaft 21.

The top of the main agitator shaft portion 34 is thus exposed, substantial unobstructed space being available between the top of shaft 34 and the bottom of the quill-shaft housing 24 for the removal of the bearing and sealing parts.

The cover 40 of housing 35 is next loosened by removing screws 41 and removed over the end of shaft 34. Bearing retainer nut 49 is then unscrewed and withdrawn and the washer 47 is removed. The thrust bearing 37—43 may then be pulled from the retainer 46 and slipped off over the end of the shaft. With the thrust bearing removed, the main shaft portion is supported by the umbrella seal 62—64. Alternatively, the seal housing 35 and the thrust bearing may be removed as a unit after removing screws 36. The shaft seal is thus exposed and may be readily removed for repair or replacement.

In order to reassemble the drive, the steps explained immediately above are simply reversed.

From the foregoing description it will be seen that the present invention provides an agitator drive assembly wherein the shaft bearing and sealing devices are easy to remove and replace without disturbing the main agitator shaft or the driving gears and motor. It will be understood that variations will occur to those skilled in the art without departing from the spirit and scope of the invention as defined in the following claims.

I claim:

1. An agitator drive assembly for a pressure vessel and the like comprising a base member having an opening therethrough, a frame member carried by said base member, a shaft having axially aligned separable portions including an agitator-mounting portion extending through the opening in said base member and a driven stub portion, removable coupling means releasably connecting adjacent ends of said separable shaft portions, bearing means removably carried by one of said members supporting said agitator-mounting shaft portion, sealing means removably carried by said base member and sealingly engaging said agitator-mounting shaft portion, a quill shaft rotatably mounted on said frame and drivingly connected to said driven shaft portion, said driven shaft portion being movable through said quill shaft in a direction axially away from the agitator-mounting shaft portion during assembly and disassembly while retaining said quill shaft in its mounting, said quill shaft being axially spaced from said agitator-mounting shaft portion to provide a gap through which said bearing means and said sealing means are removed from said agitator-mounting shaft portion, and means for connecting said quill shaft to a driving means.

2. A agitator drive assembly for a pressure vessel and the like comprising a base member having an opening therethrough, a frame member carried by said base member, a shaft having axially aligned separable portions including an agitator-mounting portion extending through the opening in said base member and a driven stub portion, removable coupling means releasably connecting adjacent ends of said separable shaft portions, bearing means removably carried by said base member supporting said agitator-mounting shaft portion, sealing means removably carried by said base member and sealingly engaging said agitator-mounting shaft portion, a quill shaft rotatably mounted on said frame and drivingly connected to said driven shaft portion, said driven shaft portion being movable through said quill shaft in a direction axially away from the agitator-mounting shaft portion during assembly and disassembly while retaining said quill shaft in its mounting, said quill shaft being axially spaced from said agitator-mounting shaft portion to provide a gap through which said bearing means and said sealing means are removed from said agitator-mounting shaft portion, and means for connecting said quill shaft to a driving means.

3. An agitator drive assembly for a pressure vessel and the like comprising a base member having an opening therethrough, a frame member carried by said base member, a shaft having axially aligned separable portions including an agitator-mounting portion extending through the opening in said base member and a driven stub portion, removable coupling means releasably connecting adjacent ends of said separable shaft portions, bearing means removably carried by said base member supporting said agitator-mounting shaft portion, sealing means removably carried by said base member and sealingly engaging said agitator-mounting shaft portion, a quill shaft rotatably mounted on said frame and drivingly connected to said driven shaft portion, said driven shaft portion being movable through said quill shaft in a direction axially away from the agitator-mounting shaft portion during assembly and disassembly while retaining said quill shaft in its mounting, said quill shaft being axially spaced from said agitator-mounting shaft portion to provide a gap through which said bearing means and said sealing means are removed from said agitator-mounting shaft portion, a motor mounted on said frame at one side of said quill shaft, and means including a gear train drivingly connecting said motor to said quill shaft.

IVAN STANLEY BRUMAGIM.

REFERENCES CITED

The following references are of record in the file of this patent:

UNITED STATES PATENTS

| Number | Name | Date |
|---|---|---|
| 1,434,331 | Ellis | Oct. 31, 1922 |
| 1,995,465 | Bigelow et al. | Mar. 26, 1935 |
| 2,090,066 | Peterson | Aug. 17, 1937 |
| 2,162,400 | Heath | June 13, 1939 |